E. F. PRENTISS & R. A. ROBERTSON.
PROCESS OF PURIFYING AND DEODORIZING WHISKY.

No. 56,863. Patented July 31, 1866.

UNITED STATES PATENT OFFICE.

E. F. PRENTISS AND R. A. ROBERTSON, OF PHILADELPHIA, PENNSYLVANIA; SAID ROBERTSON ASSIGNOR OF HIS RIGHT TO W. D. PHILBRICK AND W. J. PARSONS.

IMPROVED PROCESS FOR PURIFYING AND DEODORIZING WHISKY.

Specification forming part of Letters Patent No. 56,863, dated July 31, 1866.

*To all whom it may concern:*

Be it known that we, ELIJAH FREEMAN PRENTISS and ROBERT ADAM ROBERTSON, both of the city of Philadelphia and State of Pennsylvania, have invented a certain new and Improved Process of Purifying and Deodorizing Whisky and other Alcoholic Liquids; and we do hereby declare that the following is a full, clear, and exact description of the same, refererence being had to the annexed drawings, representing one form of the apparatus by which we carry the said process into operation, and to the letters of reference marked thereon.

The nature of our invention consists in purifying and deodorizing alcoholic liquids by passing them while in a state of vapor through the interstices of a porous, perforated, cellular, granulated, or otherwise finely-divided neutral substance kept wet with a solution of alkali or of alkaline salts, or of other substances having an equivalent purifying action, the object of employing the porous, perforated, cellular, granulated, or otherwise finely-divided neutral substance being to effect the division of the vapor, and also the diffusion of the purifying agent over a multifold or extended surface, and thus cause the vapor to come into more perfect contact with such agent, thereby securing a more thoroughly purifying action than can be effected in any way hitherto known.

Our process may be used in connection with spirit-stills of any construction; but for convenience we shall describe its application in connection with the apparatus described in the specification of Letters Patent granted to us March 1, 1864, for apparatus for distilling whisky, &c.

Figure 1:
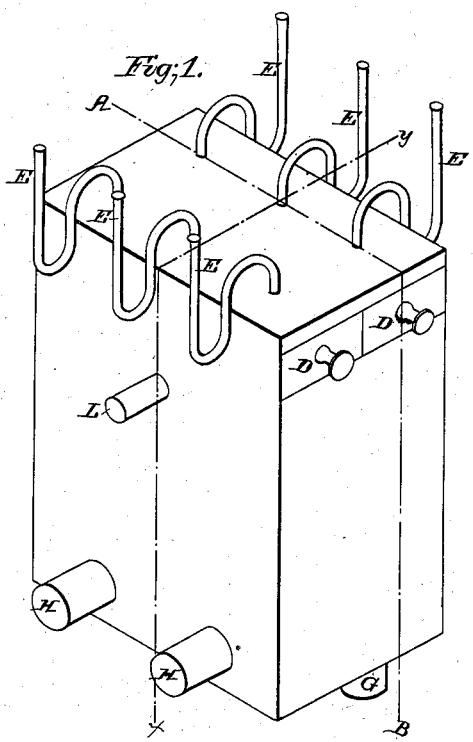
Figure 2:
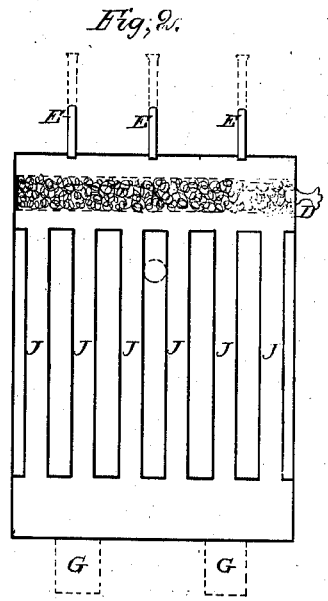
Figure 3:
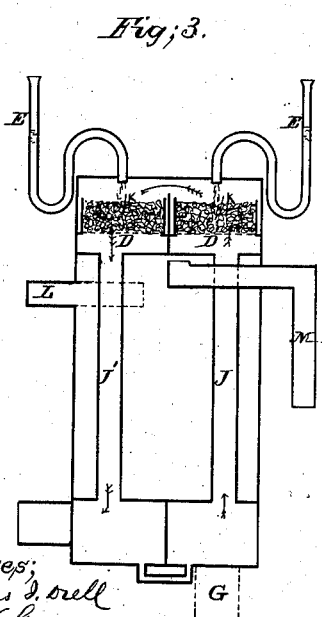
Figure 4:
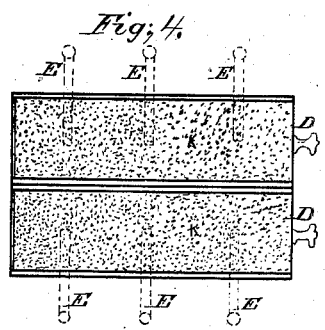

In the drawings, Figure 1 is a perspective view of the chamber described in said specification as chamber No. 3, showing also the alterations that are necessary for carrying out our improvements. Fig. 2 is a vertical section of the same on the line A B of Fig. 1. Fig. 3 is a vertical cross-section of the same on the line *x y* of Fig. 1. Fig. 4 is a horizontal section through the perforated drawers D.

D are cases or drawers made of wire-gauze or other perforated material the equivalent thereof. These cases contain a cellular, granulated, or otherwise finely-divided neutral substance, K, through the interstices of which the alcoholic vapor is compelled to pass on its way from the chamber described in said specification as chamber No. 4 to the chamber therein described as No. 2. The course of the vapor through the substance mentioned is shown by the arrows.

E are trap-tubes, by means of which we introduce in regulated quantities a solution of alkali or of alkaline salts, or of other substances having an equivalent purifying action, onto the neutral substance K, contained in the cases D.

G are pipes through which the vapor enters when coming from said chamber No. 4.

H are pipes through which the purified vapor passes into said chamber No. 2.

J are small tubes through which the vapor passes in the direction of the arrows.

The method of carrying our process into effect is as follows: The alcoholic vapor passes through the pipes G from the chamber called No. 4 in our aforesaid Letters Patent, and follows the course described by the arrows through the neutral body contained in cases D, and out through the pipe H. The purifying solution (colored brown in the drawings) is introduced in regulated quantities through the trap-tubes E onto the top of the neutral body contained in the cases D and diffuses itself over and through the mass of the neutral body, and thence drips downward, through the pipes J, into the bottom of the chamber, thence, through the pipes G, into chamber No. 4, carrying with it the impurities removed from the alcoholic vapor. The vapor coming from said chamber No. 4, in passing through the interstices of the neutral substance K, is minutely divided and its particles brought into more complete contact with the purifying agent, and thereby more perfectly exposed to its action, by which we accomplish a better result with the use of much less of the purifying agent than has been hitherto effected.

For the neutral body we prefer to use pumice-stone or white porous sandstone (as their porosity facilitates the diffusion of the purifying agent) in grains or pieces about the size of buckshot, although other substances which will finely divide the particles of vapor without preventing their passage may be substituted.

For the purifying agent we prefer to use carbonate of potash in solution, composed of about one pound of the salt to two gallons of water.

In distilling from ordinary corn-wash we obtain a good result by using, in the manner described, two gallons of this solution to every barrel of proof-liquor produced. The vapor from different kinds of wash will require some more and some less of the solution, according to the amount of the impurities therein contained. The exact amount required for any particular wash can be readily ascertained by any one skilled in the art by testing the distillate.

Having thus described our invention, what we claim, and desire to secure by Letters Patent, is—

The process of purifying and deodorizing alcoholic liquids by passing them while in a vaporous state through the interstices of a porous, perforated, cellular, granulated, or otherwise finely-divided neutral material kept wet with a solution of alkali or of alkaline salts, or of other substances having an equivalent purifying action, in the manner and for the purposes substantially as described.

E. FREEMAN PRENTISS.
 ROBERT ADAM ROBERTSON.

Witnesses:
 THOMAS I. DIEHL,
 J. E. SHAW.